United States Patent
Oh et al.

(10) Patent No.: US 11,990,580 B2
(45) Date of Patent: May 21, 2024

(54) APPARATUS FOR MANUFACTURING BATTERY CELL

(71) Applicants: Hyundai Motor Company, Seoul (KR); Kia Corporation, Seoul (KR)

(72) Inventors: Hokyeong Oh, Seoul (KR); SeHo Kwon, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 175 days.

(21) Appl. No.: 17/410,821

(22) Filed: Aug. 24, 2021

(65) Prior Publication Data

US 2022/0200037 A1    Jun. 23, 2022

(30) Foreign Application Priority Data

Dec. 21, 2020   (KR) .................... 10-2020-0179850

(51) Int. Cl.
*H01M 10/04* (2006.01)

(52) U.S. Cl.
CPC ..... *H01M 10/049* (2013.01); *H01M 10/0431* (2013.01)

(58) Field of Classification Search
CPC ............. H01M 10/049; H01M 10/045; H01M 10/0431
See application file for complete search history.

(56) References Cited

FOREIGN PATENT DOCUMENTS

| CN | 105428697 A | * | 3/2016 | ........ H01M 10/0468 |
|---|---|---|---|---|
| KR | 10-2015-0066711 A | | 6/2015 | |
| KR | 10-1730469 B1 | | 4/2017 | |
| WO | WO-2020085835 A1 | * | 4/2020 | ............. B65G 15/58 |

OTHER PUBLICATIONS

Machine translation of WO 2020085835 A1 (Year: 2020).*
Machine translation of KR 20150066711 A (Year: 2015).*
Machine translation of CN 105428697 A (Year: 2016).*

* cited by examiner

*Primary Examiner* — Matthew T Martin
*Assistant Examiner* — Unique Jenevieve Luna
(74) *Attorney, Agent, or Firm* — MORGAN, LEWIS & BOCKIUS LLP

(57) ABSTRACT

An apparatus for manufacturing a battery cell by stacking a negative electrode, a separator, and a positive electrode includes, a loading unit of loading the negative electrode, separator, and positive electrode, a negative electrode stacking unit disposed adjacent to the loading unit, and configured to cut a negative electrode material unwound from a negative electrode roll to a preset length and stack the cut negative electrode material on the loading unit, a separator stacking unit disposed adjacent to the loading unit, and configured to cut a separator material unwound from a separator roll to a preset length and to stack the cut separator material on the loading unit, and a positive electrode stacking unit disposed adjacent to the stacking unit, and configured to cut a positive electrode material unwound from a positive electrode roll to a preset length and stack the cut positive electrode material on the loading unit.

20 Claims, 12 Drawing Sheets

APPARATUS FOR MANUFACTURING BATTERY CELL

CROSS-REFERENCE TO RELATED APPLICATION

The present application claims priority to Korean Patent Application No. 10-2020-0179850 filed on Dec. 21, 2020, the entire contents of which is incorporated herein for all purposes by this reference.

BACKGROUND OF THE INVENTION

Field of the Invention

The present invention relates to an apparatus of manufacturing a battery cell.

Description of Related Art

In general, secondary batteries are energy storage media with high energy density which may be charged and discharged by reversible conversion of chemical energy and electrical energy.

The secondary batteries include nickel-cadmium batteries, nickel-metal hydride batteries, nickel-hydrogen batteries, and lithium secondary batteries.

This secondary battery includes a stack of a positive electrode, a separator, and a negative electrode that are impregnated in an electrolyte solution.

Methods of manufacturing such secondary batteries may be largely divided into two.

In the case of a small secondary battery, a method of disposing the negative electrode and the positive electrode on a separator and winding them to form a jelly-roll is widely used. In the case of a medium or large secondary battery having more electrical capacity, a method of stacking a negative electrode, a separator, and a positive electrode in an appropriate sequence is widely used.

As the size of the secondary battery increases, a sagging phenomenon or a curving phenomenon may occur during transfer of a negative electrode, a separator, and a positive electrode.

Accordingly, the alignment of the negative electrodes, separators, and positive electrodes may deteriorate, and in the instant case, the battery capacity may be decreased.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing apparatus of manufacturing a battery cell which may suppress the sagging phenomenon and the curving phenomenon during transfer of a negative electrode, a separator, and a positive electrode.

An apparatus of manufacturing a battery cell by stacking a negative electrode, a separator, and a positive electrode includes, a loading unit configured to load the negative electrode, the separator, and the positive electrode, a negative electrode stacking unit disposed in a first direction of the loading unit, and configured to cut a negative electrode material unwound from a negative electrode roll to a preset first length and to stack the cut negative electrode material on the loading unit, a separator stacking unit disposed in a second direction of the loading unit, and configured to cut a separator material unwound from a separator roll to a preset second length and to stack the cut separator material on the loading unit, and a positive electrode stacking unit disposed in a third direction of the loading unit, and configured to cut a positive electrode material unwound from a positive electrode roll to a preset third length and to stack the cut positive electrode material on the loading unit.

The loading unit may include, a table configured to be movable in a vertical direction, and configured to stack the negative electrode, the separator, and the positive electrode on an upper surface of the table, and a plurality of clampers disposed along a circumference of the table, and configured to operate in a direction toward or away from the table through a first linear module, to vertically operate through a second linear module mounted on the first linear module, and to clamp the negative electrode, the separator, and the positive electrode stacked on the upper surface of the table.

The negative electrode stacking unit may include, a negative electrode unwinding portion configured to load the negative electrode roll, and configured to unwind the negative electrode material wound around the negative electrode roll by a feeding roller, a negative electrode seating portion on which the negative electrode material unwound from the negative electrode roll is seated, a negative electrode cutting portion disposed between the negative electrode unwinding portion and the negative electrode seating portion and configured to cut the negative electrode material unwound from the negative electrode roll to the preset length, and a negative electrode inversion portion disposed in the first direction of the loading unit, and configured to receive a negative electrode cut into a preset length by the negative electrode cutting portion, and to stack the negative electrode on the loading unit.

The negative electrode seating portion may be configured to fix the negative electrode material seated on an upper surface through vacuum adsorption.

A negative electrode transfer gripper may be configured between the negative electrode seating portion and the negative electrode inversion portion. The negative electrode transfer gripper may be configured to, when a vacuum of the negative electrode seating portion is removed, transfer the negative electrode from the negative electrode seating portion to the negative electrode inversion portion through vacuum adsorption on an upper portion of the negative electrode.

The negative electrode inversion portion may include, a negative electrode gripping plate on which the negative electrode is transferred from the negative electrode seating portion, and a negative electrode rotation plate configured at a frontal end portion of the negative electrode gripping plate, and configured to transfer the negative electrode seated on the negative electrode gripping plate on an upper surface of the loading unit by rotating the negative electrode gripping plate by 180°.

The negative electrode rotation plate may be mounted on a mounting block through a servo-motor. The mounting block may be mounted on a first movable module to be movable along a side surface of the loading unit. The first movable module may be mounted on a second movable module to be movable in a direction toward or away from the loading unit.

The negative electrode inversion portion may include a negative electrode sensing portion configured to sense home positioning of the negative electrode seated on an upper surface of the negative electrode inversion portion.

The separator stacking unit may include, a separator unwinding portion configured to load the separator roll, and configured to unwind the separator material wound around the separator roll by a feeding roller, a separator seating portion on which the separator material unwound from the separator roll is seated, a separator cutting portion disposed between the separator unwinding portion and the separator seating portion and configured to cut the separator material unwound from the separator roll to the preset length, and a separator inversion portion disposed in the second direction of the loading unit, and configured to receive a separator cut into a preset length by the separator cutting portion, and to stack the separator on the loading unit.

The separator seating portion may be configured to fix the separator seated on an upper surface through vacuum adsorption.

A separator transfer gripper may be configured between the separator seating portion and the separator inversion portion. The separator transfer gripper may be configured to, when a vacuum of the separator seating portion is removed, transfer the separator from the separator seating portion to the separator inversion portion through vacuum adsorption on an upper portion of the separator.

The separator inversion portion may include, a separator gripping plate on which the separator is transferred from the separator seating portion, and a separator rotation plate configured at a frontal end portion of the separator gripping plate, and configured to transfer the separator seated on the separator gripping plate on an upper surface of the loading unit by rotating the separator gripping plate by 180°.

The separator rotation plate may be mounted on a mounting block through a servo-motor. The mounting block may be mounted on a first movable module to be movable along a side surface of the loading unit. The first movable module may be mounted on a second movable module to be movable in a direction toward or away from the loading unit.

The separator inversion portion may include a separator sensing portion configured to sense home positioning of the separator seated on an upper surface of the separator inversion portion.

The positive electrode stacking unit may include, a positive electrode unwinding portion configured to load the positive electrode roll, and configured to unwind the positive electrode material wound around the positive electrode roll by a feeding roller, a positive electrode seating portion on which the positive electrode material unwound from the positive electrode roll is seated, a positive electrode cutting portion disposed between the positive electrode unwinding portion and the positive electrode seating portion and configured to cut the positive electrode material unwound from the positive electrode roll to the preset length, and a positive electrode inversion portion disposed in the third direction of the loading unit, and configured to receive a positive electrode cut into a preset length by the positive electrode cutting portion, and to stack the positive electrode on the loading unit.

The positive electrode seating portion may be configured to fix the positive electrode seated on an upper surface of the positive electrode seating portion through vacuum adsorption.

A positive electrode transfer gripper is positioned between the positive electrode seating portion and the positive electrode inversion portion. The positive electrode transfer gripper may be configured to, when a vacuum of the positive electrode seating portion is removed, transfer the positive electrode from the positive electrode seating portion to the positive electrode inversion portion through vacuum adsorption on an upper portion of the positive electrode.

The positive electrode inversion portion may include, a positive electrode gripping plate on which the positive electrode loaded on the positive electrode seating portion is transferred, and a positive electrode rotation plate configured at a frontal end of the positive electrode gripping plate, and configured to transfer the positive electrode seated on the positive electrode gripping plate on an upper surface of the loading unit by rotating the positive electrode gripping plate by 180°.

The positive electrode rotation plate may be mounted on a mounting block through a servo-motor. The mounting block may be mounted on a first movable module to be movable along a side surface of the loading unit. The first movable module may be mounted on a second movable module to be movable in a direction toward or away from the loading unit.

The positive electrode inversion portion may include a positive electrode sensing portion configured to sense home positioning of the positive electrode seated on an upper surface of the positive electrode inversion portion.

In an apparatus of manufacturing a battery cell according to various exemplary embodiments of the present invention, when transferring the negative electrode 10, the separator 20, and the positive electrode 30 of the battery cell 1 that are manufactured in a large area, sagging phenomenon and curving phenomenon may be suppressed.

Furthermore, in an apparatus of manufacturing a battery cell according to various exemplary embodiments of the present invention, the negative electrode stacking unit 200, the separator 20 stacking unit 300, and the positive electrode stacking unit 400 are disposed adjacent to the loading unit 100, and the unwinding portion, the seating portion, the cutting portion, and the inversion portion of the stacking units are integrated, reducing the size of the overall manufacturing apparatus.

Other effects which may be obtained or are predicted by an exemplary embodiment will be explicitly or implicitly described in a detailed description of the present invention. That is, various effects that are predicted according to an exemplary embodiment will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
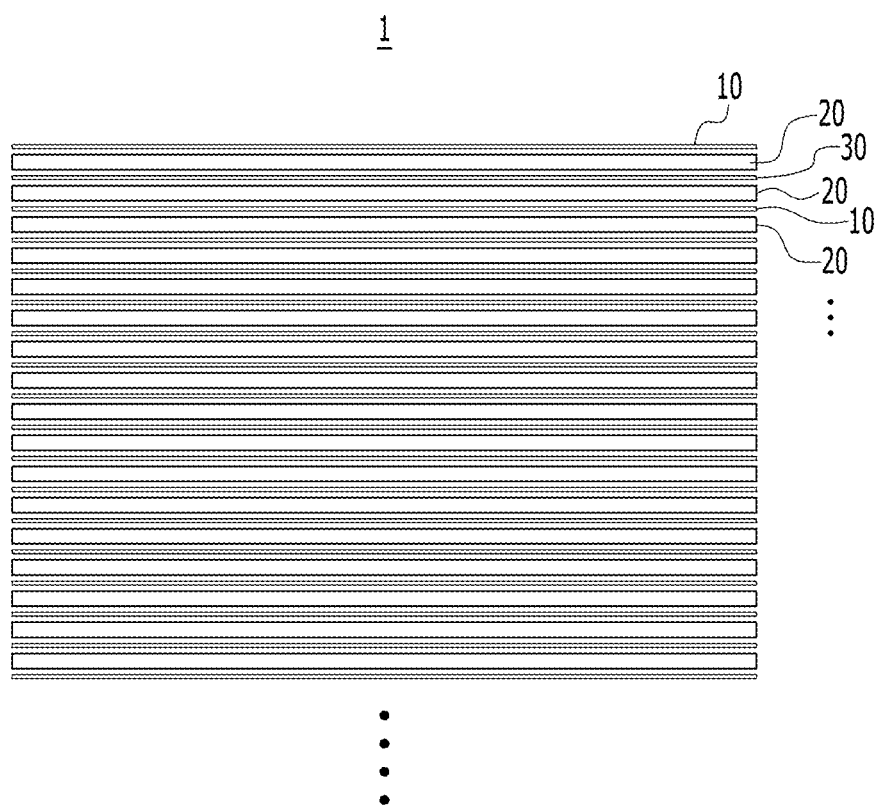
FIG. 1 is a schematic diagram of a battery cell manufactured by an apparatus of manufacturing a battery cell according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

To clarify the present invention, parts that are not related to the description will be omitted, and the same elements or equivalents are referred to with the same reference numerals throughout the specification.

In the following description, dividing names of components into first, second, and the like is to divide the names because the names of the components are the same as each other, and an order thereof is not particularly limited.

Figure 2:
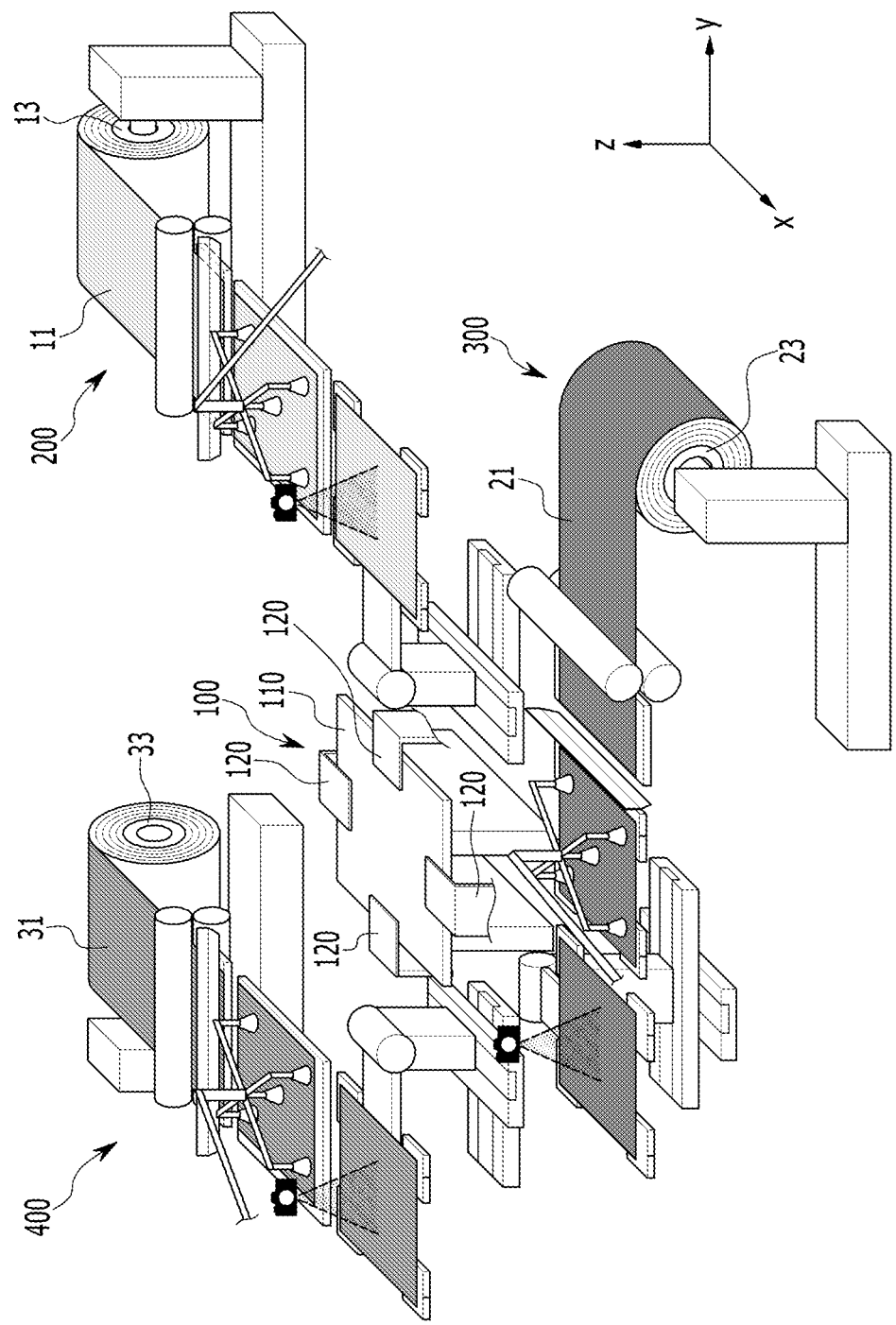
FIG. 2 is an overall schematic diagram of an apparatus of manufacturing a battery cell according to various exemplary embodiments of the present invention.

FIG. 1 is a schematic diagram of a battery cell manufactured by an apparatus of manufacturing a battery cell according to various exemplary embodiments of the present invention. FIG. 2 is an overall schematic diagram of an apparatus of manufacturing a battery cell according to various exemplary embodiments of the present invention.

Referring to FIG. 1, an apparatus of manufacturing a battery cell according to various exemplary embodiments of the present invention may be applied to manufacture a battery cell 1 by stacking a negative electrode 10, a separator 20, and a positive electrode 30.

The apparatus of manufacturing a battery cell according to various exemplary embodiments of the present invention may be applied to stack the negative electrode 10, the separator 20, and the positive electrode 30 manufactured in a large area.

For example, the apparatus of manufacturing a battery cell according to various exemplary embodiments of the present invention may be applied for the battery cell 1, which is manufactured generally 10 times greater than the area of a general battery cell accommodated in an electric vehicle.

The battery cell 1 may achieve a high charge rate when the negative electrode 10, the separator 20, and the positive electrode 30 are cut to a preset size (e.g., a preset length) and appropriate stacked.

For such a purpose, referring to FIG. 2, an apparatus of manufacturing a battery cell according to exemplary embodiment includes a loading unit 100, a negative electrode stacking unit 200, a separator stacking unit 300, and a positive electrode stacking unit 400.

The apparatus of manufacturing a battery cell has the loading unit 100 disposed in a center portion, and the negative electrode stacking unit 200, the separator stacking unit 300, and the positive electrode stacking unit 400 are disposed in four directions of the loading unit 100.

The negative electrode stacking unit 200 may be disposed in a first direction, for example, on the right side with respect to the loading unit 100.

The separator stacking unit 300 may be disposed in a second direction, for example, on the front side with respect to the loading unit 100.

The positive electrode stacking unit 400 may be disposed in a third direction, for example, on the left side with respect to the loading unit 100.

In various exemplary embodiments of the present invention, the front-rear (x), left-right (y) and vertical (z) directions are set as the reference directions based on the drawing.

The above definition of reference directions has relative meanings, and may not necessarily limited thereto since directionality may vary depending on reference positions of the exemplary apparatus or constituent parts employed therein.

Hereinafter, the separator stacking unit 300 is referenced to be the front side, the negative electrode stacking unit 200 is referenced to be the right side, the positive electrode stacking unit 400 is reference to be the left side thereof.

Hereinafter, with reference to the drawings, a portion located upward is called an upper portion, an upper end, an upper surface, and an upper end portion, a portion located downward is called a lower part, a lower end, a lower surface, and a lower end portion.

In addition, hereinafter, an "end (one end, another end, and the like)" may be defined as any one end or may be defined as a portion (one end portion, another end portion, and the like) including that end.

Although it is described that, with reference to the loading unit 100, the negative electrode stacking unit 200 is disposed in the right side, the separator stacking unit 300 is disposed in the front side, and the positive electrode stacking unit 400 is disposed in the left side, however, the exemplary embodiment is not limited thereto. It may be understood that positions of the stacking units may be changed.

Figure 3:
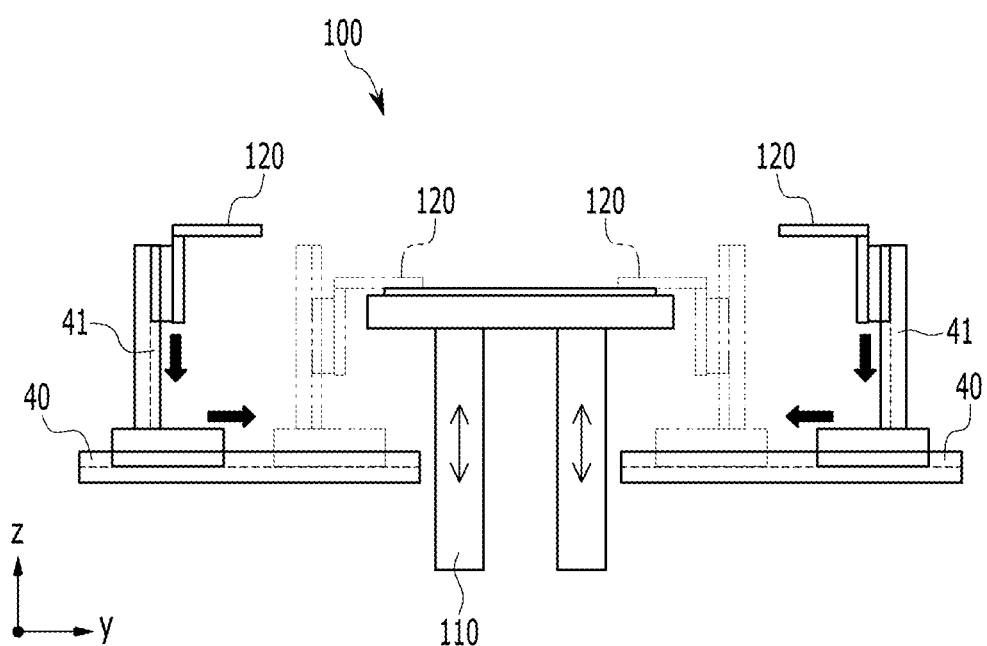
FIG. 3 is a schematic diagram of a loading unit applied to an apparatus of manufacturing a battery cell according to various exemplary embodiments of the present invention.

FIG. 3 is a schematic diagram of a loading unit applied to an apparatus of manufacturing a battery cell according to various exemplary embodiments of the present invention.

Referring to FIG. 3, in various exemplary embodiments of the present invention, the loading unit 100 is configured to load the negative electrode 10, the separator 20, and the positive electrode 30 that are cut into the preset size, sequentially.

The loading unit 100 includes a table 110 and a plurality of clampers 120 disposed along the circumference of the table 110.

The table 110 is configured for moving in a vertical direction thereof.

The negative electrode 10, the separator 20, and the positive electrode 30 that are in the preset size are stacked in plural quantities on an upper surface of the table 110.

The table 110 may be formed in a rectangular shape corresponding to the battery cell 1.

The clamper 120 is configured at each of four sides of the table 110.

The clamper 120 is formed in a generally L-shape, disposed along the circumference of the table 110, and configured to clamp the negative electrode 10, the separator 20, and the positive electrode 30 that are stacked on the upper surface of the table 110.

The clamper 120 may operate in a direction toward or away from the table 110 through a first linear module 40.

Furthermore, a second linear module 41 is mounted on the first linear module 40, and the clamper 120 may vertically operate through the second linear module 41.

Figure 4:
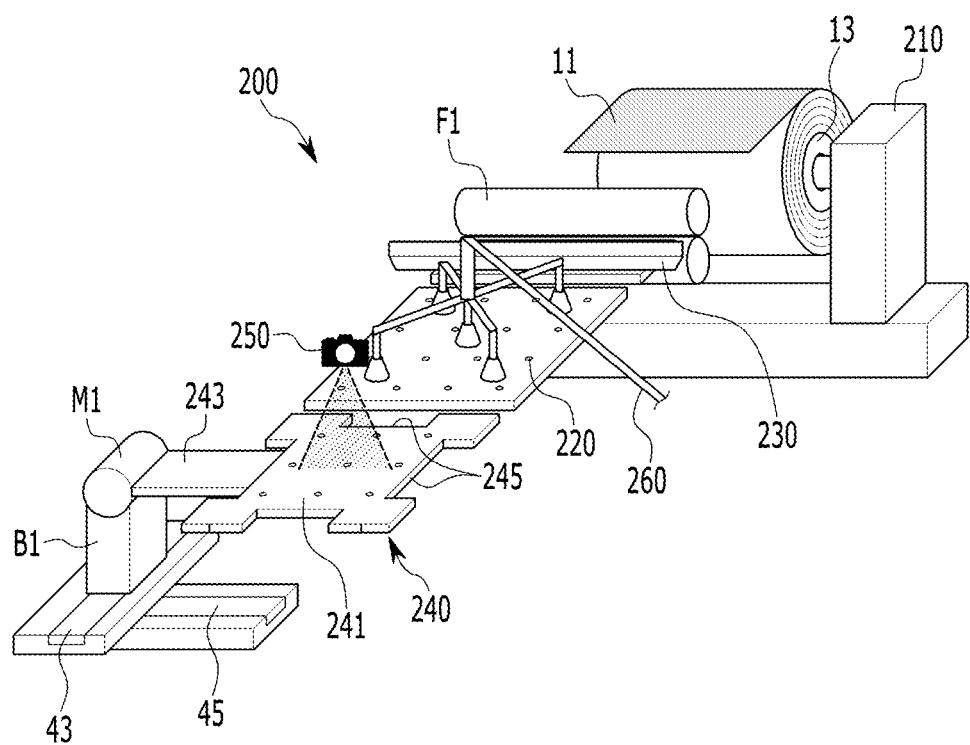
FIG. 4 is a schematic diagram of a negative electrode stacking unit applied to an apparatus of manufacturing a battery cell according to various exemplary embodiments of the present invention.
Figure 5:
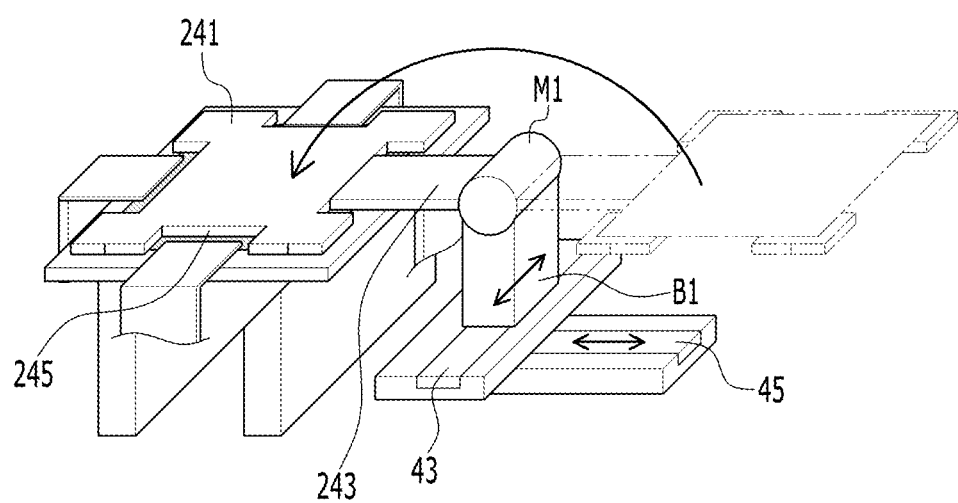
FIG. 5 and FIG. 6 are drawings for explaining the operation of the negative electrode stacking unit applied to an apparatus of manufacturing a battery cell according to various exemplary embodiments of the present invention.
Figure 6:
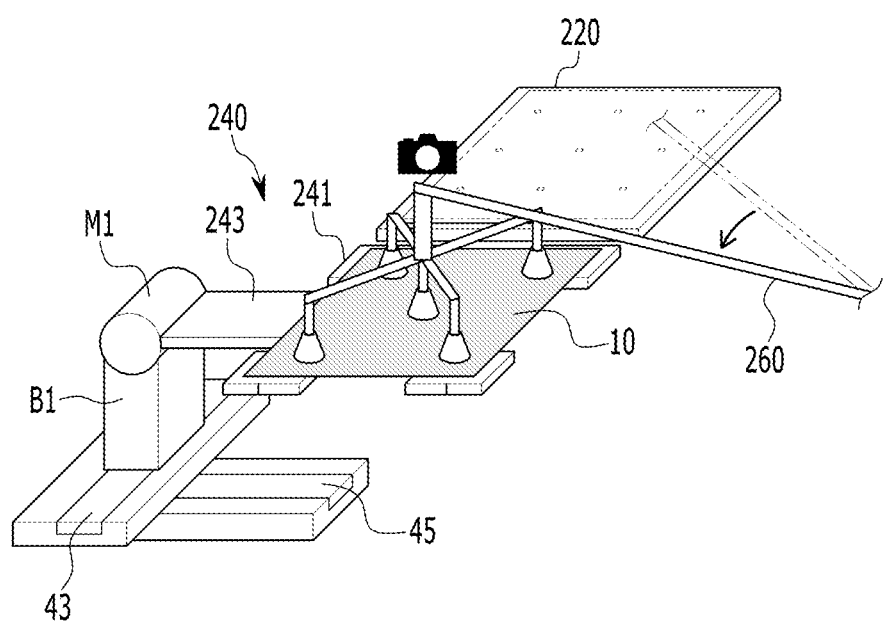

FIG. 4 is a schematic diagram of a negative electrode stacking unit applied to an apparatus of manufacturing a battery cell according to various exemplary embodiments of the present invention. FIG. 5 and FIG. 6 are drawings for explaining the operation of the negative electrode stacking unit applied to an apparatus of manufacturing a battery cell according to various exemplary embodiments of the present invention.

Referring to FIG. 4, in various exemplary embodiments of the present invention, the negative electrode stacking unit 200 may be configured at left side of the loading unit 100.

The negative electrode stacking unit 200 may include a negative electrode unwinding portion 210, a negative electrode seating portion 220, a negative electrode cutting portion 230, and a negative electrode inversion portion 240.

A negative electrode roll 13 is loaded in the negative electrode unwinding portion 210.

A negative electrode material 11 of the preset length is wound in the negative electrode roll 13.

The negative electrode material 11 may be unwound from the negative electrode roll 13 by a first feeding roller F1.

The negative electrode cutting portion 230 is disposed between the negative electrode unwinding portion 210 and the negative electrode seating portion 220.

The negative electrode cutting portion 230 cuts the negative electrode material 11 unwound from the negative electrode roll 13, to the preset length.

Furthermore, the negative electrode seating portion 220 is configured at front side of the negative electrode cutting portion 230.

The negative electrode material 11 is unwound by the first feeding roller F1 and seated on the negative electrode seating portion 220.

At the present time, the negative electrode seating portion 220 fixes the negative electrode material 11 seated on the upper surface through vacuum adsorption.

That is, when the negative electrode material 11 is fixed on the negative electrode seating portion 220 by vacuum adsorption, the negative electrode material 11 may be cut by the negative electrode cutting portion 230 to the preset length to form the negative electrode 10.

The negative electrode inversion portion 240 is configured at front side of the negative electrode seating portion 220.

The negative electrode inversion portion 240 is disposed in a first direction (i.e., the right side) of the loading unit 100.

The negative electrode 10 cut into the preset length by the negative electrode cutting portion 230 is transferred to the negative electrode inversion portion 240.

The negative electrode inversion portion 240 stacks the negative electrode 10 on the loading unit 100.

The negative electrode inversion portion 240 includes a negative electrode gripping plate 241 on which the negative electrode 10 is seated, and a negative electrode rotation plate 243 connected to a frontal end portion of the negative electrode gripping plate 241.

The negative electrode gripping plate 241 is formed in the shape of a rectangular plate, and each of four edge portions forms a negative electrode gripping plate recess 245 which is recessed toward the center.

The negative electrode gripping plate recess 245 is to secure a space for the clamper 120 to enter when the negative electrode 10 is seated on the table 110.

When the negative electrode 10 is seated on an upper surface of the negative electrode gripping plate 241, the negative electrode gripping plate 241 may fix the negative electrode 10 through vacuum adsorption.

Furthermore, a negative electrode sensing portion 250 may be configured above the negative electrode gripping plate 241 to sense home positioning of the negative electrode 10 seated on the upper surface of negative electrode gripping plate 241.

For example, the negative electrode sensing portion 250 may include a vision camera.

Referring to FIG. 5, the negative electrode rotation plate 243 may transfer the negative electrode 10 seated on the negative electrode gripping plate 241 to an upper surface of the loading unit 100 by rotating the negative electrode gripping plate 241 by 180°.

The negative electrode rotation plate 243 may be rotatably mounted on a first mounting block B1 through a first servo-motor M1.

In the negative electrode inversion portion 240, the first mounting block B1 is mounted on a first movable module 43 to be movable along a side surface of the loading unit 100 (i.e., in the front-rear direction), and the first movable module 43 is mounted on a second movable module 45 to be movable along a direction toward or away from the loading unit 100 (i.e., in the left-right direction).

Referring to FIG. 6, a negative electrode transfer gripper 260 is formed between the negative electrode seating portion 220 and the negative electrode inversion portion 240.

The negative electrode transfer gripper 260 may transfer the negative electrode 10 from the negative electrode seating portion 220 to the negative electrode inversion portion 240.

The negative electrode transfer gripper 260 may be an adsorption device that performs vacuum adsorption with respect to the negative electrode 10.

The negative electrode transfer gripper 260 may be configured to rotate and move in the front-rear direction by a servo-motor.

At the present time, the negative electrode 10 may be moved from the negative electrode seating portion 220 to the negative electrode inversion portion 240 by the negative electrode transfer gripper 260.

When the vacuum of the negative electrode seating portion 220 is removed, the negative electrode transfer gripper 260 may vacuum adsorb the negative electrode 10 and transfer the negative electrode 10 to the negative electrode inversion portion 240.

When the negative electrode 10 is transferred by the negative electrode transfer gripper 260 from the negative electrode seating portion 220 to the negative electrode gripping plate 241 of the negative electrode inversion portion 240, the negative electrode gripping plate 241 is rotated by 180° by the first servo-motor M1 connected to the negative electrode rotation plate 243, and thereby the negative electrode 10 seated on the upper surface of the negative electrode gripping plate 241 may be stacked on the loading unit 100.

Figure 7:
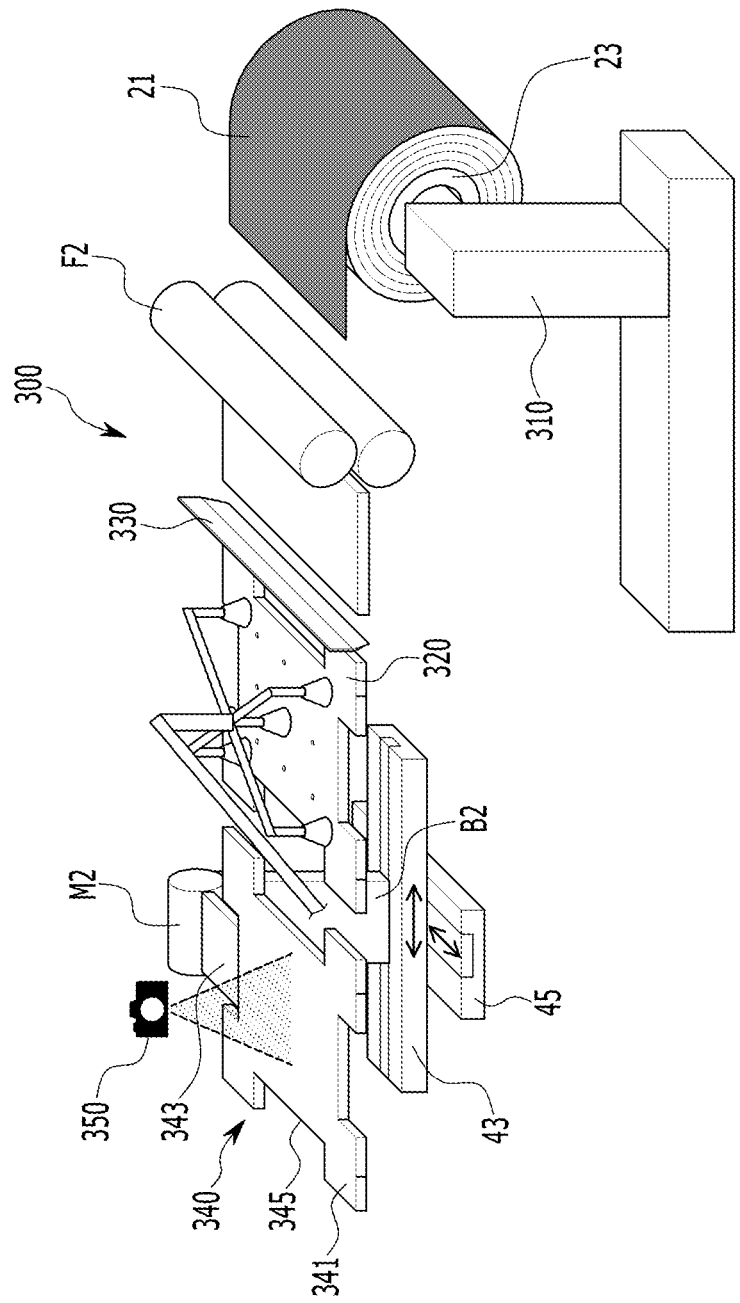
FIG. 7 is a schematic diagram of a separator stacking unit applied to an apparatus of manufacturing a battery cell according to various exemplary embodiments of the present invention.
Figure 8:
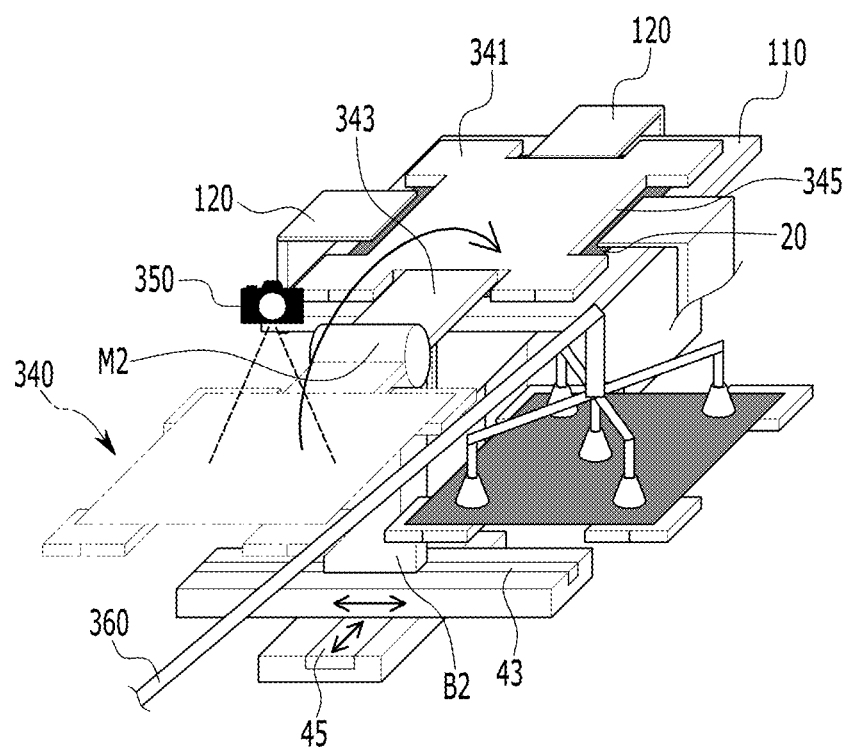
FIG. 8 and FIG. 9 are drawings for explaining the operation of the separator stacking unit applied to an apparatus of manufacturing a battery cell according to various exemplary embodiments of the present invention.
Figure 9:
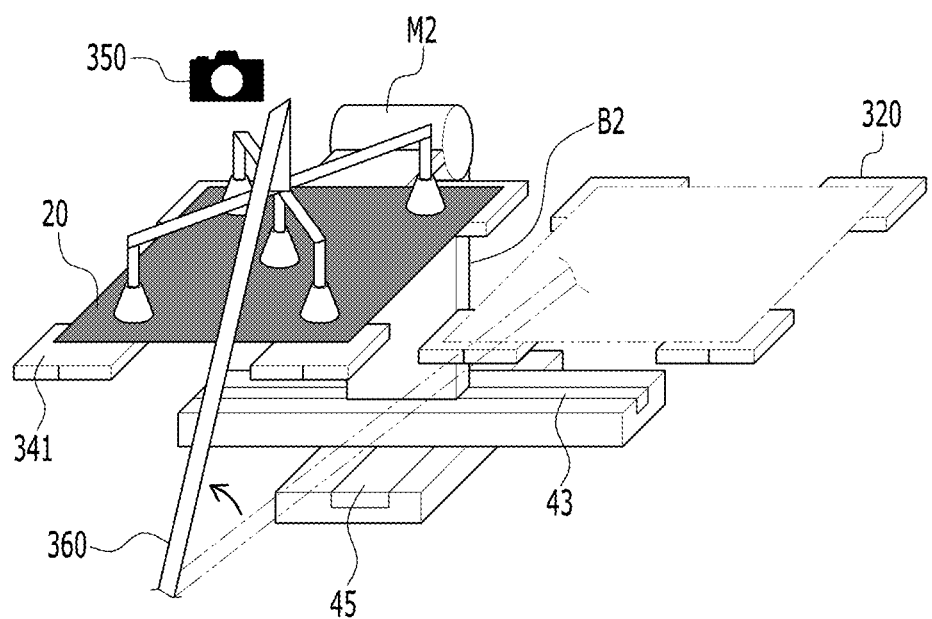

FIG. 7 is a schematic diagram of a separator stacking unit applied to an apparatus of manufacturing a battery cell according to various exemplary embodiments of the present invention. FIG. 8 and FIG. 9 are drawings for explaining the operation of the separator stacking unit applied to an apparatus of manufacturing a battery cell according to various exemplary embodiments of the present invention.

Referring to FIG. 7, in various exemplary embodiments of the present invention, the separator stacking unit 300 may be configured at front side of the loading unit 100.

The separator stacking unit 300 may include a separator unwinding portion 310, a separator seating portion 320, a separator cutting portion 330, and a separator inversion portion 340.

A separator roll 23 is loaded in the separator unwinding portion 310.

A separator material 21 of the preset length is wound in the separator roll 23.

The separator material 21 may be unwound from the separator roll 23 by a second feeding roller F2.

The separator cutting portion 330 is configured at left side of the separator unwinding portion 310.

That is, the separator cutting portion 330 is disposed in a front side of the separator unwinding portion 310 along a moving direction of the separator material 21.

The separator cutting portion 330 cuts the separator material 21 unwound from the separator roll 23, to the preset length.

Furthermore, the separator seating portion 320 is configured at left side of the separator cutting portion 330.

The separator material 21 is unwound by the second feeding roller F2 and seated on the separator seating portion 320.

At the present time, the separator seating portion 320 fixes the separator material 21 seated on the upper surface through vacuum adsorption.

That is, when the separator material 21 is fixed on the separator seating portion 320 by vacuum adsorption, the separator material 21 may be cut by the separator cutting portion 330 to the preset length to form the separator 20.

The separator inversion portion 340 is configured at left side of the separator seating portion 320.

The separator inversion portion 340 is disposed in a second direction (i.e., the front side) of the loading unit 100.

The separator 20 cut into the preset length by the separator cutting portion 330 is transferred to the separator inversion portion 340.

The separator inversion portion 340 includes a separator gripping plate 341 on which the separator 20 is seated, and a separator rotation plate 343 connected to a frontal end portion of the separator gripping plate 341.

The separator gripping plate 341 is formed in the shape of a rectangular plate, and each of four edge portions forms a separator gripping plate recess 345 which is recessed toward the center.

The separator gripping plate recess 345 is to secure a space for the clamper 120 to enter when the separator 20 is seated on the table 110.

Furthermore, a separator sensing portion 350 may be configured above the separator gripping plate 341 to sense home positioning of the separator 20 seated on an upper surface of the separator gripping plate 341.

For example, the negative electrode sensing portion 250 may include a vision camera.

Referring to FIG. 8, the separator rotation plate 343 may transfer the separator 20 seated on the separator gripping plate 341 to the upper surface of the loading unit 100 by rotating the separator gripping plate 341 by 180°.

The separator rotation plate 343 may be rotatably mounted on a second mounting block B2 through a second servo-motor M2.

In the separator inversion portion 340, the second mounting block B2 is mounted on the first movable module 43 to be movable along a side surface of the loading unit 100 (i.e., in the left-right direction), and the first movable module 43 is mounted on the second movable module 45 to be movable along a direction toward or away from the loading unit 100 (i.e., in the front-rear direction).

Referring to FIG. 9, a separator transfer gripper 360 is formed between the separator seating portion 320 and the separator inversion portion 340.

The separator transfer gripper 360 may transfer the separator 20 from the separator seating portion 320 to the separator inversion portion 340.

The separator transfer gripper 360 may be an adsorption device that performs vacuum adsorption with respect to the separator 20.

The negative electrode transfer gripper 360 may be configured to rotate and move in the front-rear direction by a servo-motor.

At the present time, the separator 20 may be moved from the separator seating portion 320 to the separator inversion portion 340 by the separator transfer gripper 360.

When the vacuum of the separator seating portion 320 is removed, the separator transfer gripper 360 may vacuum adsorb the separator 20 and transfer the separator 20 to the separator inversion portion 340.

When the separator 20 is transferred by the separator transfer gripper 360 from the separator seating portion 320 to the separator gripping plate 341 of the separator inversion portion 340, the separator gripping plate 341 is rotated by 180° by the separator rotation plate 343, and thereby the separator 20 seated on the upper surface of the separator gripping plate 341 may be stacked on the loading unit 100.

Figure 10:
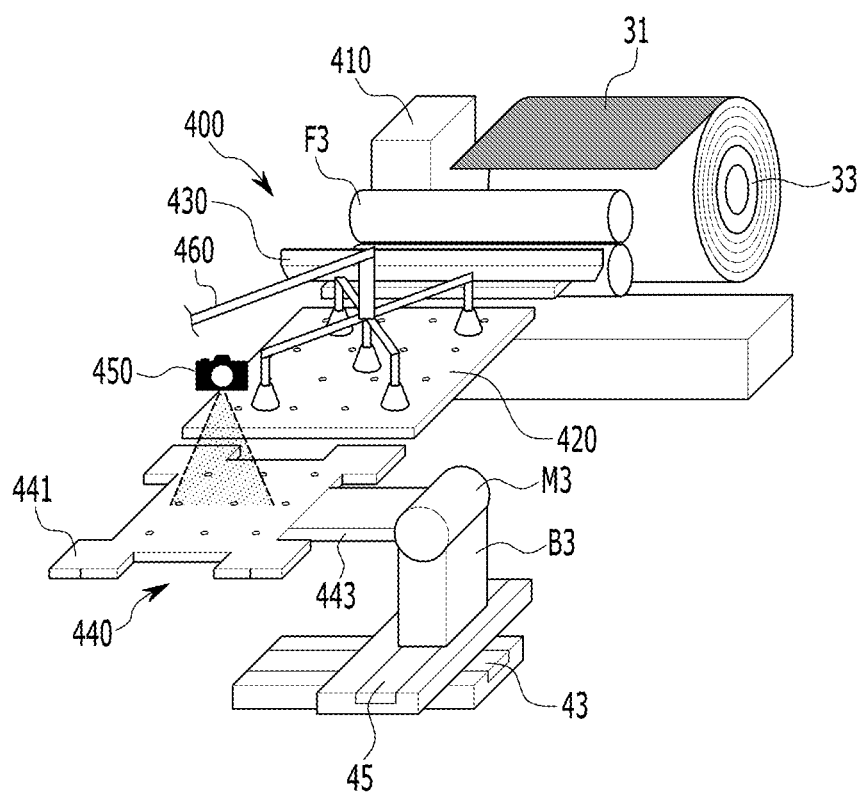
FIG. 10 is a schematic diagram of a positive electrode stacking unit applied to an apparatus of manufacturing a battery cell according to various exemplary embodiments of the present invention.
Figure 11:
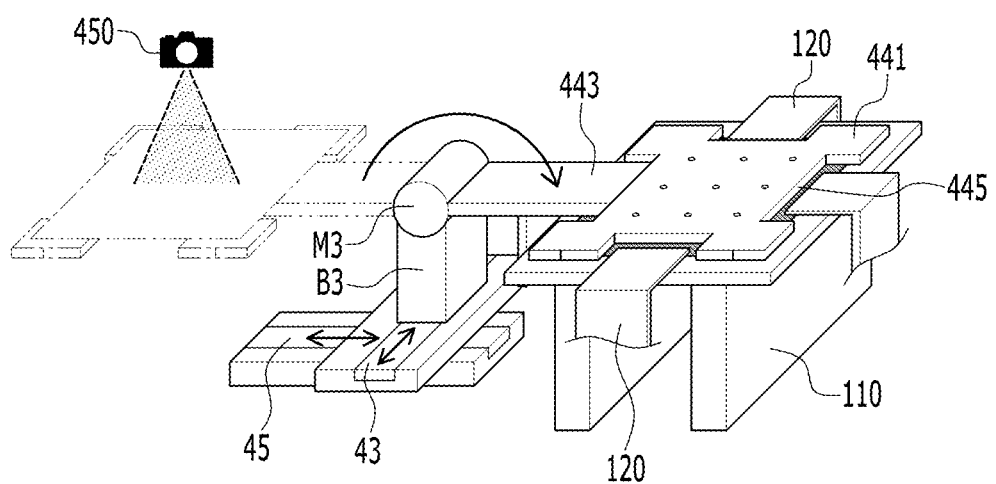
FIG. 11 and FIG. 12 are drawings for explaining the operation of the positive electrode stacking unit applied to an apparatus of manufacturing a battery cell according to various exemplary embodiments of the present invention.
Figure 12:
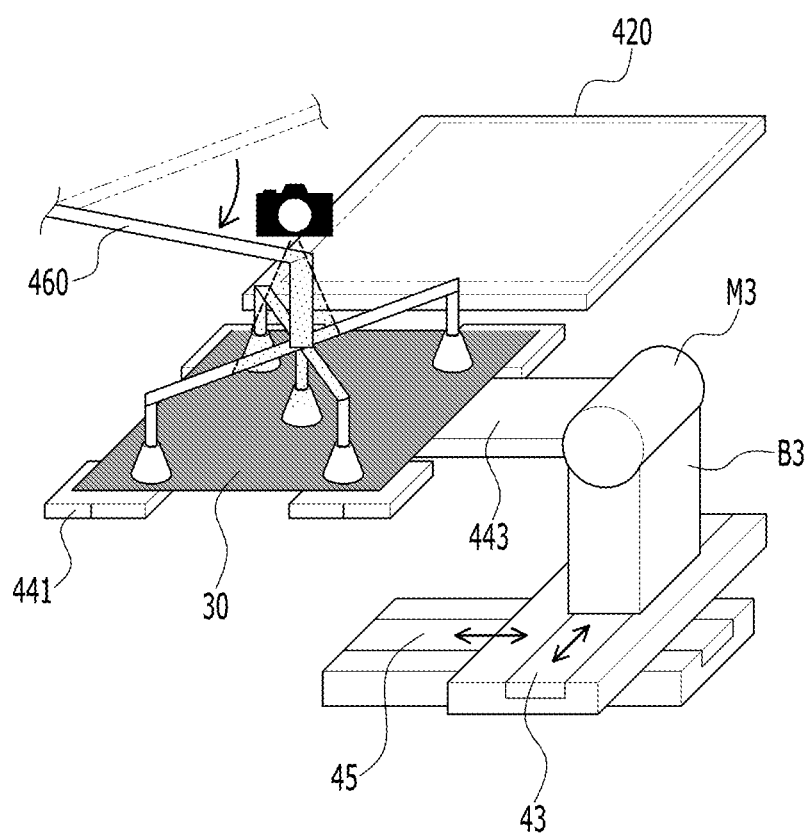

FIG. 10 is a schematic diagram of a positive electrode stacking unit applied to an apparatus of manufacturing a battery cell according to various exemplary embodiments of the present invention. FIG. 11 and FIG. 12 are drawings for explaining the operation of the positive electrode stacking unit applied to an apparatus of manufacturing a battery cell according to various exemplary embodiments of the present invention.

Referring to FIG. 10, in various exemplary embodiments of the present invention, the positive electrode stacking unit 400 may be configured at right side of the loading unit 100.

The positive electrode stacking unit 400 may include a positive electrode unwinding portion 410, a positive electrode seating portion 420, a positive electrode cutting portion 430, and a positive electrode inversion portion 440.

A positive electrode roll 33 is loaded in the positive electrode unwinding portion 410.

A positive electrode material 31 of the preset length is wound in the positive electrode roll 33.

The positive electrode material 31 may be unwound from the positive electrode roll 33 by third feeding roller F3.

The positive electrode cutting portion 430 is configured at front side of the positive electrode unwinding portion 410.

The positive electrode cutting portion 430 cuts the positive electrode material 31 unwound from the positive electrode roll 33, to the preset length.

Furthermore, the positive electrode seating portion 420 is configured at front side of the positive electrode cutting portion 430.

The positive electrode material 31 is unwound by the third feeding roller F3 and seated on the positive electrode seating portion 420.

At the present time, the positive electrode seating portion 420 fixes the positive electrode material 31 seated on the upper surface through vacuum adsorption.

That is, when the positive electrode material 31 is fixed on the positive electrode seating portion 420 by vacuum adsorption, the positive electrode material 31 may be cut by the positive electrode cutting portion 430 to the preset length to form the positive electrode 30.

The positive electrode inversion portion 440 is configured at front side of the positive electrode seating portion 420.

The positive electrode inversion portion 440 is disposed in a third direction (i.e., the left side) of the loading unit 100.

The positive electrode 30 cut into the preset length by the positive electrode cutting portion 430 is transferred to the positive electrode inversion portion 440.

The positive electrode inversion portion 440 includes a positive electrode gripping plate 441 on which the positive electrode 30 is seated, and a positive electrode rotation plate 443 connected to a frontal end portion of the positive electrode gripping plate 441.

The positive electrode gripping plate 441 is formed in the shape of a rectangular plate, and each of four edge portions forms a positive electrode gripping plate recess 445 which is recessed toward the center.

The positive electrode gripping plate recess 445 is to secure a space for the clamper 120 to enter when the positive electrode 30 is seated on the table 110.

When the positive electrode 30 is seated on an upper surface of the positive electrode gripping plate 441, the positive electrode gripping plate 441 fix the positive electrode 30 through vacuum adsorption.

Furthermore, a positive electrode sensing portion 450 may be configured above the positive electrode gripping plate 441 to sense home positioning of the positive electrode 30 seated on the upper surface of the positive electrode gripping plate 441.

For example, the positive electrode sensing portion 450 may include a vision camera.

Referring to FIG. 11, the positive electrode rotation plate 443 may transfer the positive electrode 30 seated on the positive electrode gripping plate 441 to the upper surface of the loading unit 100 by rotating the positive electrode gripping plate 441 by 180°.

The positive electrode rotation plate 443 may be rotatably mounted on a third mounting block B3 through a third servo-motor M3.

In the positive electrode inversion portion 440, the third mounting block B3 is mounted on the first movable module 43 to be movable along a side surface of the loading unit 100 (i.e., in the front-rear direction), and the first movable module 43 is mounted on the second movable module 45 to be movable along a direction toward or away from the loading unit 100 (i.e., in the left-right direction).

Referring to FIG. 12, a positive electrode transfer gripper 460 is formed between the positive electrode seating portion 420 and the positive electrode inversion portion 440.

The positive electrode transfer gripper 460 may transfer the positive electrode 30 from the positive electrode seating portion 420 to the positive electrode inversion portion 440.

The positive electrode transfer gripper 460 may be an adsorption device that performs vacuum adsorption with respect to the positive electrode 30.

The negative electrode transfer gripper 460 may be configured to rotate and move in the front-rear direction by a servo-motor.

At the present time, the positive electrode 30 may be moved from the positive electrode seating portion 420 to the positive electrode inversion portion 440 by the positive electrode transfer gripper 460.

When the vacuum of the positive electrode seating portion 420 is removed, the positive electrode transfer gripper 460 may vacuum adsorb the positive electrode 30 and transfer the positive electrode 30 to the positive electrode inversion portion 440.

When the positive electrode 30 is transferred by the positive electrode transfer gripper 460 from the positive electrode seating portion 420 to the positive electrode gripping plate 441 of the positive electrode inversion portion 440, the positive electrode gripping plate 441 is rotated by 180° by the positive electrode rotation plate 443, and thereby the positive electrode 30 seated on the upper surface of the positive electrode gripping plate 441 may be stacked on the loading unit 100.

Therefore, in an apparatus of manufacturing a battery cell according to various exemplary embodiments of the present invention, when transferring the negative electrode 10, the separator 20, and the positive electrode 30 of the battery cell 1 that are manufactured in a large area, sagging phenomenon and curving phenomenon may be suppressed.

Furthermore, in an apparatus of manufacturing a battery cell according to various exemplary embodiments of the present invention, the negative electrode stacking unit 200, the separator 20 stacking unit 300, and the positive electrode stacking unit 400 are disposed adjacent to the loading unit 100, and the unwinding portion, the seating portion, the cutting portion, and the inversion portion of the stacking units are integrated, reducing the size of the overall manufacturing apparatus.

Furthermore, according to the apparatus of manufacturing a battery cell, due to an optimized disposition configuration, moving distances of the negative electrode 10, the separator 20, and the positive electrode 30 are short, and thereby the inflow of foreign material may be decreased.

Furthermore, in an apparatus of manufacturing a battery cell according to various exemplary embodiments of the present invention, alignment may be improved by performing position adjustment by each detecting portion before stacking on the loading unit 100.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for manufacturing a battery cell by stacking a negative electrode, a separator, and a positive electrode, the apparatus comprising:
    a loading unit configured to load the negative electrode, the separator, and the positive electrode;
    a negative electrode stacking unit disposed in a first direction of the loading unit, and configured to cut a negative electrode material unwound from a negative electrode roll to a preset first length and to stack the cut negative electrode material on the loading unit;
    a separator stacking unit disposed in a second direction of the loading unit, and configured to cut a separator material unwound from a separator roll to a preset second length and to stack the cut separator material on the loading unit; and
    a positive electrode stacking unit disposed in a third direction of the loading unit, and configured to cut a positive electrode material unwound from a positive electrode roll to a preset third length and to stack the cut positive electrode material on the loading unit,
    wherein the cut negative electrode material, the cut separator material, and the cut positive electrode material are sequentially staked on the loading unit,
    wherein the negative electrode material is cut while being fixed to the negative electrode stacking unit through vacuum adsorption, the cut negative electrode material is transferred to the loading unit without losing vacuum adsorption, and the cut negative electrode material remains fixed in the loading unit through vacuum adsorption,
    wherein the separator material is cut while being fixed to the separator stacking unit through vacuum adsorption, the cut separator material is transferred to the loading unit without losing vacuum adsorption, and the cut separator material is stacked on the cut negative electrode material while the cut negative electrode material is fixed to the loading unit through vacuum adsorption, and
    wherein the positive electrode material is cut while being fixed to the positive electrode stacking unit through vacuum adsorption, the cut positive electrode material is transferred to the loading unit without losing vacuum adsorption, and the cut positive electrode material is stacked on the cut separator material while the cut separator material is stacked on the cut negative electrode material.

2. The apparatus of claim 1, wherein the loading unit includes:
    a table configured to be movable in a vertical direction thereof, and configured to stack the negative electrode, the separator, and the positive electrode on an upper surface of the table; and
    a plurality of dampers disposed along a circumference of the table, and configured to operate in a direction toward or away from the table through a first linear module, to vertically operate through a second linear module mounted on the first linear module, and to clamp the negative electrode, the separator, and the positive electrode stacked on the upper surface of the table.

3. The apparatus of claim 1, wherein the negative electrode stacking unit includes:
    a negative electrode unwinding portion configured to load the negative electrode roll, and configured to unwind the negative electrode material wound around the negative electrode roll by a feeding roller;
    a negative electrode seating portion on which the negative electrode material unwound from the negative electrode roll is seated;
    a negative electrode cutting portion disposed between the negative electrode unwinding portion and the negative electrode seating portion and configured to cut the negative electrode material unwound from the negative electrode roll to the preset first length; and
    a negative electrode inversion portion disposed in the first direction of the loading unit, and configured to receive a negative electrode cut into a preset length by the negative electrode cutting portion, and to stack the negative electrode on the loading unit.

4. The apparatus of claim 3, wherein the negative electrode seating portion is configured to fix the negative electrode material seated on an upper surface of the negative electrode seating portion through vacuum adsorption.

5. The apparatus of claim 4,
    wherein a negative electrode transfer gripper is positioned between the negative electrode seating portion and the negative electrode inversion portion; and
    wherein the negative electrode transfer gripper is configured to, when a vacuum of the negative electrode seating portion is removed, transfer the negative electrode from the negative electrode seating portion to the negative electrode inversion portion through vacuum adsorption on an upper portion of the negative electrode.

6. The apparatus of claim 3, wherein the negative electrode inversion portion includes:
    a negative electrode gripping plate on which the negative electrode is transferred from the negative electrode seating portion; and
    a negative electrode rotation plate configured at a frontal end portion of the negative electrode gripping plate, and configured to transfer the negative electrode seated on the negative electrode gripping plate on an upper surface of the loading unit by rotating the negative electrode gripping plate by 180°.

7. The apparatus of claim 6,
wherein the negative electrode rotation plate is mounted on a mounting block through a servo-motor;
wherein the mounting block is mounted on a first movable module to be movable along a side surface of the loading unit; and
wherein the first movable module is mounted on a second movable module to be movable in a direction toward or away from the loading unit.

8. The apparatus of claim 3, wherein the negative electrode inversion portion includes a negative electrode sensing portion configured to sense home positioning of the negative electrode seated on an upper surface of the negative electrode inversion portion.

9. The apparatus of claim 1, wherein the separator stacking unit includes:
a separator unwinding portion configured to load the separator roll, and configured to unwind the separator material wound around the separator roll by a feeding roller;
a separator seating portion on which the separator material unwound from the separator roll is seated;
a separator cutting portion disposed between the separator unwinding portion and the separator seating portion and configured to cut the separator material unwound from the separator roll to the preset second length; and
a separator inversion portion disposed in the second direction of the loading unit, and configured to receive a separator cut into a preset length by the separator cutting portion, and to stack the separator on the loading unit.

10. The apparatus of claim 9, wherein the separator seating portion is configured to fix the separator seated on an upper surface of the separator seating portion through vacuum adsorption.

11. The apparatus of claim 10,
wherein a separator transfer gripper is positioned between the separator seating portion and the separator inversion portion; and
wherein the separator transfer gripper is configured to, when a vacuum of the separator seating portion is removed, transfer the separator from the separator seating portion to the separator inversion portion through vacuum adsorption on an upper portion of the separator.

12. The apparatus of claim 9, wherein the separator inversion portion includes:
a separator gripping plate on which the separator is transferred from the separator seating portion; and
a separator rotation plate configured at a frontal end portion of the separator gripping plate, and configured to transfer the separator seated on the separator gripping plate on an upper surface of the loading unit by rotating the separator gripping plate by 180°.

13. The apparatus of claim 12,
wherein the separator rotation plate is mounted on a mounting block through a servo-motor;
wherein the mounting block is mounted on a first movable module to be movable along a side surface of the loading unit; and
wherein the first movable module is mounted on a second movable module to be movable in a direction toward or away from the loading unit.

14. The apparatus of claim 9, wherein the separator inversion portion includes a separator sensing portion configured to sense home positioning of the separator seated on an upper surface of the separator inversion portion.

15. The apparatus of claim 1, wherein the positive electrode stacking unit includes:
a positive electrode unwinding portion configured to load the positive electrode roll, and configured to unwind the positive electrode material wound around the positive electrode roll by a feeding roller;
a positive electrode seating portion on which the positive electrode material unwound from the positive electrode roll is seated;
a positive electrode cutting portion disposed between the positive electrode unwinding portion and the positive electrode seating portion and configured to cut the positive electrode material unwound from the positive electrode roll to the preset third length; and
a positive electrode inversion portion disposed in the third direction of the loading unit, and configured to receive a positive electrode cut into a preset length by the positive electrode cutting portion, and to stack the positive electrode on the loading unit.

16. The apparatus of claim 15, wherein the positive electrode seating portion is configured to fix the positive electrode seated on an upper surface of the positive electrode seating portion through vacuum adsorption.

17. The apparatus of claim 16,
wherein a positive electrode transfer gripper is positioned between the positive electrode seating portion and the positive electrode inversion portion; and
wherein the positive electrode transfer gripper is configured to, when a vacuum of the positive electrode seating portion is removed, transfer the positive electrode from the positive electrode seating portion to the positive electrode inversion portion through vacuum adsorption on an upper portion of the positive electrode.

18. The apparatus of claim 15, wherein the positive electrode inversion portion includes:
a positive electrode gripping plate on which the positive electrode loaded on the positive electrode seating portion is transferred; and
a positive electrode rotation plate configured at a frontal end portion of the positive electrode gripping plate, and configured to transfer the positive electrode seated on the positive electrode gripping plate on an upper surface of the loading unit by rotating the positive electrode gripping plate by 180°.

19. The apparatus of claim 18,
wherein the positive electrode rotation plate is mounted on a mounting block through a servo-motor;
wherein the mounting block is mounted on a first movable module to be movable along a side surface of the loading unit; and
wherein the first movable module is mounted on a second movable module to be movable in a direction toward or away from the loading unit.

20. The apparatus of claim 15, wherein the positive electrode inversion portion includes a positive electrode sensing portion configured to sense home positioning of the positive electrode seated on an upper surface of the positive electrode inversion portion.

* * * * *